United States Patent [19]

McClure

[11] Patent Number: 5,014,783

[45] Date of Patent: May 14, 1991

[54] SEQUENTIALLY FLOODING AN OIL-BEARING FORMATION WITH A SURFACTANT AND HOT AQUEOUS FLUID

[75] Inventor: D. Craig McClure, Littleton, Colo.

[73] Assignee: Marathon Oil Company, Findlay, Ohio

[21] Appl. No.: 576,083

[22] Filed: Aug. 28, 1990

Related U.S. Application Data

[63] Continuation of Ser. No. 348,311, May 5, 1989, abandoned, which is a continuation-in-part of Ser. No. 192,454, May 11, 1988, Pat. No. 4,842,065.

[51] Int. Cl.$^5$ .............................................. E21B 43/22
[52] U.S. Cl. ...................................... 166/252; 166/274
[58] Field of Search ............... 166/252, 273, 274, 275, 166/263

[56] References Cited

U.S. PATENT DOCUMENTS

| | | | |
|---|---|---|---|
| 3,357,487 | 12/1967 | Gilchrist et al. | 166/11 |
| 3,454,095 | 7/1969 | Messenger et al. | 166/303 |
| 3,498,378 | 3/1970 | Stone et al. | 166/263 |
| 4,191,252 | 3/1980 | Buckley et al. | 166/272 |
| 4,364,431 | 12/1982 | Saidi et al. | 166/275 |
| 4,694,904 | 9/1987 | Sengul et al. | 166/252 |

OTHER PUBLICATIONS

E. R. Brownscombe et al., "Water-Imbibition Displacement—Can It Release Reluctant Spraberry Oil?", *The Oil and Gas Journal*, Nov. 17, 1952, pp. 264-265 and 377-378.

C. M. Blair, Jr., "Field Evaluation of Interfacial Spreading Agent Using Cyclic Decline Curves", SPE 14906, SPE/DOE Fifth Symposium on Enhanced Oil Recovery of the Society of Petroleum Engineers and the Department of Energy, Tulsa, Okla., Apr. 20-23, 1986.

M. O. Amabeoku et al., "Temperature Effects on Low Tension Surfactant Flood Efficiency in Consolidated Sands", University of Southern California, pp. 223-237.

J. D. Akins, "Field Results of Adding Surfactant to Cyclic Steam Wells", SPE 12007m 58th Annual Technical Conference and Exhibition, San Francisco, Calif., Oct. 5-8, 1983.

G. Geopalkrishnan et al., "An Enhanced Oil Recovery Method: Injection of Steam with Surfactant Solutions", SPE 7109, American Institute of Mining, Metallurgical, and Petroleum Engineers, Inc.

Primary Examiner—William P. Neuder
Attorney, Agent, or Firm—Jack L. Hummel; Jack E. Ebel

[57] ABSTRACT

A surfactant solution is injected into an oil-wet fractured formation and becomes the preferred wetting phase of the matrix blocks in the formation thereby displacing oil from the matrix blocks into the fracture network. The formation is then flooded with a hot aqueous fluid to displace the oil from the fracture network to the surface while returning the matrix blocks to an oil-wet condition. The injection cycle is repeated until the formation is depleted.

21 Claims, No Drawings

SEQUENTIALLY FLOODING AN OIL-BEARING FORMATION WITH A SURFACTANT AND HOT AQUEOUS FLUID

This is a continuation application of co-pending patent application Ser. No. 07/348,311 filed on May 5, 1989, which is a continuation-in-part application of U.S. Pat. No. 4,842,065, issued on June 27, 1989, now U.S. Pat. No. 4,842,065.

BACKGROUND OF THE INVENTION

1. Technical Field:

The invention relates to a process for recovering oil from a subterranean oil-bearing formation and more particularly to a process for cycling wettability-altering fluids through a subterranean oil-bearing formation to enhance oil recovery therefrom.

2. Background Information:

The art recognizes that oil recovery by means of conventional waterflooding is ineffective in fractured formations because channeling occurs through the fracture network. The art proposes a number of solutions to this problem. Brownscombe et al, Stone et al, and Sengul et al expressly employ imbibition displacement processes to increase oil recovery relative to conventional waterflooding in fractured formations.

"Water-Imbibition Displacement", E. R. Brownscombe et al, Oil and Gas Journal, v. 51, n. 28, Nov. 17, 1952, page 264, describes an oil recovery process employing water-imbibition displacement in the naturally-fractured water-wet Spraberry Field of West Texas.

U.S. Pat. No. 3,498,378 to Stone et al utilizes a surfactant solution in the Spraberry Field to pressurize the formation and change its preferential wettability from water-wet to oil-wet. Oil is then produced until the water-to-oil ratio reaches an economic limit. Production is interrupted and water is injected into the formation to restore the bottom hole pressure. Oil production resumes again until it falls below acceptable economic limits. Pressure pulsing with water is repeated until diminished recovery necessitates the injection of additional surfactant. The cycle can be repeated until the formation is depleted.

U.S. Pat. No. 4,694,904 to Sengul et al cyclically floods a fractured formation with two separate fluids having disparate mobilities. The lower mobility fluid may be a polymer solution and the higher mobility fluid may be water or a surfactant solution. The process is designed to match the performance of a continuous polymer flood, but at a lower cost because polymer use for the process is reduced.

U.S. Pat. No. 4,364,431 to Saidi et al utilizes a surfactant to augment a waterflood which displaces oil from a fractured oil-wet formation, by a gravity drive mechanism rather than an imbibition displaced mechanism. Saidi suggests that the surfactant reduces the interfacial tension between the water in the fractures and the oil in the matrix blocks of the formation, which enables the oil to enter the fractures where it is driven upward to a producing well by the density difference between water and oil.

The above-cited references fail to realize the full potential of an imbibition displacement process to recover oil from a formation. Although Brownscombe et al, Stone et al, and Sengul et al expressly employ an imbibition displacement mechanism, none of the references recognize specific improvements which could render the mechanism more effective. Furthermore, none of the references recognize the utility of the mechanism beyond water-wet formations.

A need exists for a process which substantially improves the performance of fluids which are injected into a fractured formation to recover oil from the formation. A further need exists for a process which both maximizes the amount of oil recovered from a fractured formation and accelerates the rate of oil production from the formation without substantially increasing the volume requirement of injected fluids.

SUMMARY of the INVENTION

The present invention is a process for recovering oil from an oil-wet fractured subterranean formation by altering the wettability of the oil-bearing formation with cyclically injected fluids. The process utilizes an imbibition displacement mechanism to both increase and accelerate oil recovery from the formation. The process is particularly effective in fractured oil-wet formations which have undergone primary and secondary oil recovery by either waterflooding or polymer-augmented waterflooding, but wherein a substantial portion of oil remains unrecovered in the matrix blocks of the fractured formation.

The process employs a class of compositions commonly known as surfactants to alter the initial preferential wettability of an oil-wet formation. The process is initiated by injecting a slug of a surfactant solution into a wellbore in fluid communication with the oil-wet formation. The solution enters the fracture network of the formation and subsequently imbibes into a portion of the matrix blocks adjacent the fracture network. The solution renders the portion of the matrix blocks it contacts surfactant-wet. The solution simultaneously displaces oil from the surfactant-wet portion of the matrix blocks into the fracture network.

Following injection of the surfactant solution, the formation is flooded with a hot aqueous fluid which performs two functions. First, the hot aqueous fluid desorbs the surfactant solution from the surfactant-wet portion of the matrix blocks, restoring this portion of the matrix blocks to an oil-wet condition. Second, the hot aqueous fluid displaces the oil residing in the fracture network to the surface via a production well where the oil is recovered. The hot aqueous flood is continued until the water-to-oil ratio of recovered fluids becomes uneconomical at which point it is terminated.

After termination of the hot aqueous flood, the injection cycle is repeated anew by injecting a second slug of the surfactant solution into the formation followed by a hot aqueous flood. The cycle can be repeated as often as desired until the formation is depleted.

The invention is particularly advantageous because it enables oil recovery from an oil-wet formation by an imbibition displacement mechanism which was previously believed to only have utility in water-wet formations. The present process employs a fluid injection sequence which enables the surfactant to more fully penetrate the matrix blocks and contact additional oil heretofore unrecoverable from a fractured oil-wet formation.

DESCRIPTION OF PREFERRED EMBODIMENTS

The present invention is a cycle process for sequentially injecting wettability-altering fluids into a fractured subterranean oil-bearing formation and recovering oil from the formation. A fractured formation is a formation having a highly permeable connective fracture network channelling through the formation matrix. Connective fracture networks are generally associated with naturally fractured formations rather than artificially fractured ones.

The formation matrix, which makes up the bulk of the formation, is much less permeable than the fracture network. The matrix comprises continuous competent porous formation rock which contains oil within the pore spaces of the rock structure. A pervasive fracture network isolates the matrix into discrete matrix blocks.

The present process is applicable to formations having matrix blocks comprising rock which is characterized on the basis of its wettability as initially oil-wet. The wettability of a rock is defined herein as the ability of the rock surface to preferentially absorb a given liquid and become selectively coated by the liquid in the presence of a second liquid. Thus, oil-wet rock preferentially absorbs oil, water-wet rock preferentially absorbs water, and surfactant-wet rock preferentially absorbs surfactant.

The term "surfactant-wet" has not received wide usage because previous literature has generally termed rock coated with a surfactant in the presence of water and oil as either water-wet or oil-wet. The present invention recognizes that in these cases the surfactant is the true wetting phase rather than the water or oil because the surfactant coats the rock while the oil or water is attracted to and coats the surfactant. Thus, in the present process where the injected surfactant is believed to coat the rock, the term "surfactant-wet" is employed as the most accurate description of wettability.

Formations characterized herein as oil-wet are formations which contain at least some rock, if not all of the formation rock, which is oil-wet. Thus, the matrix blocks of a fractured oil-wet formation, as defined according to the present invention, may contain entirely oil-wet rock or may only partially contain oil-wet rock with the remaining rock having a different wettability. Matrix blocks having some sites which are oil-wet and some sites which are water-wet have been characterized in previous literature as neutral-wet. However, for the purposes of the present invention, the term "oil-wet formation" encompasses both entirely oil-wet formations and neutral-wet formations to the extent that the neutral-wet formations contain some oil-wet sites.

The present process is not limited to formations of a given temperature, but the process is more applicable to formations having a relatively low ambient temperature. Thus, the present process is preferably applicable to formations having an ambient temperature range from about 21° C. to about 66° C. and most preferably from about 21° C. to about 38° C.

The present process is initiated by injecting a slug containing a wettability-altering agent in solution into an injection wellbore in fluid communication with an oil-wet fractured formation. The wettability-altering agent is a composition from a class of compounds commonly known as surfactants. Surfactants generally have a hydrophilic and a lipophilic character which varies as a function of the surfactant composition as well as the nature of the formation rock and connate fluids which the surfactant contacts.

A surfactant solution is selected for use in the present invention having a character which is capable of altering the wettability of the matrix rock such that the surfactant becomes the preferred wetting phase of the rock over the initial preferred oil-wetting phase. The skilled artisan can readily determine a surfactant which is suitable for altering the wettability of a given rock by laboratory experimentation.

The present invention is not limited to a particular surfactant so long as the surfactant satisfies the above-stated criteria. Nevertheless, a preferred surfactant for use in the present invention is one which achieves a substantially neutral balance between its hydrophilic and lipophilic character within the given formation in which the surfactant is placed. Exemplary types of surfactants which may have utility in the present invention include ethoxylated alkylphenols, ethoxysulfate alkylphenols, ethoxylated alcohols, ethoxysulfate alcohols, alpha olefin sulfonates, internal olefin sulfonates, alkyl aryl sulfonates, petroleum sulfonates, propoxylated ethoxylated alcohols, propoxylated ethoxylated sulfates, and propoxylated ethoxylated sulfonates.

The surfactant solution is prepared by mixing the selected surfactant in a diluent. The concentration of the surfactant in the diluent is greater than about 0.01% by weight. The concentration is preferably between about 0.1% and about 4.0% by weight. The concentration is most preferably between about 0.2% and about 1.0% by weight.

The diluent is either a hydrocarbon solvent such as fresh water or an aqueous solvent. If a hydrocarbon solvent is used as the diluent, it is preferably a reservoir crude oil. However, an aqueous solvent is the preferred diluent, such as fresh water or a brine. Brine generally has a total dissolved solids concentration above about 1000 ppm while fresh water has a total dissolved solids concentration below about 1000 ppm. The aqueous diluent is most preferably the same composition as the fluid of the hot aqueous flood which is discussed below.

The surfactant solution is preferably heated to a temperature above the ambient temperature of the formation prior to injection therein. The maximum temperature to which the solution can be heated, is the temperature stability limit of the surfactant. Thus, for example, sulfate surfactants, which have a temperature stability limit of about 66° C., have an operable temperature range from ambient up to about 66° C. Alcohol surfactants have a stability limit of about 93° C., have an operable temperature range from ambient up to about 93° C.

The actual volume of the initial surfactant solution slug which is injected into the formation depends on which one of several embodiments encompassed within the present invention is being practiced. A number of embodiments of the process are possible, depending on how many injection and production wells are employed and the specific sequence in which they are employed.

According to one embodiment, oil production from a well adjacent one or more offset injection wells is interrupted and a slug of surfactant solution is injected into the production well. The volume of the slug is generally on the order of about 0.1 to about 1.0 formation fracture volumes. A hot aqueous fluid is then injected into the one or more offset injection wells adjacent the production well while the production well is simultaneously returned to production.

Generally, a substantially larger volume of hot aqueous fluid than the surfactant solution slug is injected into the formation via the one or more offset injection wells to displace the oil to the surface. The volume of hot aqueous fluid injected is generally at least two times larger than the volume of the slug of surfactant solution injected and may even be as much as two orders of magnitude or more greater than the volume of surfactant solution. The above-recited embodiment can further employ an extended surfactant soak time, which is defined as a period of time after injection of the surfactant solution into the formation when the oil production well is shut in. The soak time enables the surfactant solution to imbibe into the matrix blocks of the formation while simultaneously heating the matrix blocks. If a soak time is employed, its duration is determined as a function of the imbibition rate of the surfactant solution into the matrix blocks as well as the heat transfer rate between the surfactant solution and matrix blocks. Generally a soak time of a least 24 hours is selected, preferably between about 24 hours and about 4224 hours, and most preferably between about 168 hours and about 720 hours.

In other embodiments of the invention, the surfactant solution slug and hot aqueous fluid are sequentially injected into the formation via one or more offset injection wells adjacent a production well. The surfactant solution is injected first followed by the injection of the hot aqueous fluid into the same one or more wells. The production well can be shut in if desired after injection of the surfactant solution slug to provide a soak time for the solution in the formation. If the production well is shut in, the surfactant solution slug volumes and the soak times employed in this embodiment are similar to those described in the previous embodiment. Oil production is resumed when injection of the hot aqueous fluid begins.

In all of the above-described embodiments, the hot aqueous flood and oil production are continued until the water-to-oil ratio of the produced fluid exceeds an economic level. At this point injection of the hot aqueous fluid is interrupted and the injection cycle of the present process is repeated anew with the injection of a second slug of the surfactant solution followed by the hot aqueous fluid again.

The slugs of subsequent injection cycles after the initial cycle can have the same characteristics as those of the first cycle or the slugs can be modified. For example, one can alter the concentration of the surfactant solution or alter the relative volumes of the slugs, such as tapering them. Regardless, the injection cycle can be repeated any number of times until the formation is depleted.

In another embodiment of the invention, one or more surfactant solution slugs are periodically pulse injected into one or more offset injection wells while a hot aqueous fluid is simultaneously and continuously injected into one or more different offset injection wells. Oil is simultaneously and continuously produced from a production well adjacent the offset injection wells. Each injection cycle comprises the injection of one surfactant slug and the continuous injection of hot aqueous fluid to the injection of the next surfactant slug.

As in the preceding embodiments, a new injection cycle is initiated when the water-to-oil ratio of the produced fluid exceeds an economic level. The surfactant slugs of subsequent injection cycles after the initial cycle can have the same characteristics as the first cycle or the slugs of subsequent cycles can be modified.

The various embodiments recited above are performed in a manner such that the injection of fluids does not substantially increase the formation pressure at the production well. This is either because oil production is performed continuously while the fluids are being injected into the formation at a controlled rate or because the volume of surfactant solution injected into the formation is selected such that the formation pressure at the production well does not substantially increase even if the production well is shut in after surfactant injection.

The hot aqueous fluid used in the practice of the present invention is preferably simply heated water, such as a heated brine, softened brine or fresh water. It is common to soften a brine (i.e., reduce its divalent cation concentration) before heating it to minimize scale formation in the heating process equipment.

The most preferred hot aqueous fluid of the present invention is softened formation brine because it is inexpensive and abundant. Generally the hot aqueous fluid has substantially the same mobility as the surfactant solution which precedes it, although there may be some slight variations in mobility due solely to temperature differences between the two fluids.

The temperature of the hot aqueous fluid used in the practice of the present invention is greater than the ambient temperature of the formation. Thus, the temperature of the hot aqueous fluid upon injection is typically greater than about 21° C. and preferably above the boiling point of water, i.e., the hot aqueous fluid is preferably steam. When the hot aqueous fluid is steam, it is injected into the formation under conventional steam flooding conditions known to one of ordinary skill in the art.

The relative depth of the plurality of wells used in the present invention generally depends on the formation contours. However, adjacent injection and production wells are preferably placed at such relative depths that injection fluids can be uniformly displaced horizontally across the entire vertical depth of the oil-bearing zone in the formation. Thus, the injected fluids sweep substantially horizontally across the formation and displace oil across the entire vertical depth of the formation into adjacent production wells.

Although it is not known with certainty, it is believed that the mechanism of the present invention is wettability alteration of the initially oil-wet rock in the matrix blocks of the formation. Wettability alteration enhances the ability of both the surfactant and the water to displace oil from the matrix blocks by imbibition.

In practice, it is believed that the surfactant solution enters the fracture network of the formation after it is injected into a wellbore which is in direct fluid communication with the fracture network. The surfactant solution simultaneously contacts the faces of the matrix blocks bordering the fracture network and, given a sufficient contact time, imbibes across the face of the matrix blocks. The surfactant solution penetrates at least some distance away from the faces of the matrix blocks into the pores of the rock making up the outer shell of the matrix blocks. The surfactant solution alters the wettability of the oil-wet rock which it contacts to render the rock surfactant-wet. This action simultaneously displaces the oil coating the oil-wet rock back out across the faces of the matrix blocks into the fracture network. The hot aqueous fluid is then injected into the formation to displace the oil from the fracture network to a production well. The hot aqueous fluid imbibes into the outer shell of the matrix block and absorbs the surfactant from the surface of the surfactant-wet rock therein. The description of surfactant restores oil as the wetting phase of the rock in the outer shell of the matrix blocks and enables oil from the interior of the matrix blocks to resaturate and rewet the rock in the outer shell of the matrix blocks. This oil is then susceptible to imbibition displacement by a subsequent slug of surfactant solution when the fluid injection cycle is repeated.

In addition to the wettability alteration mechanism described above, it is believed that oil recovery is further enhanced by the heating effect of the injected fluids. The hot injection fluids transfer heat to the matrix blocks of the formation thereby heating the oil in place. The viscosity of the oil decreases as it is heated which enables one to more readily displace and recover the oil from the formation.

The following example illustrates the process of the present invention. However, the example is not to be construed as limiting the scope of the invention.

EXAMPLE

Two symmetrical disks are obtained from an oil-wet West Texas carbonate rock. Each disk is 1.90 cm thick and 12.7 cm in diameter. The disks are saturated with oil to irreducible water which results in an oil saturation of 70.4%. The two disks are loaded into a radial core holder with a 0.5 mm spacer between the two disks. The space between the two disks simulates a formation fracture.

An individual slug of hot water is flooded through the space between the disks continuously for seven days at a fixed temperature and a fixed flow rate of 50 cc/hr. The percentage of oil in place (% OIP) recovered after injection of the slug is then recorded.

Thereafter, the disks are resaturated with oil and the same flood is repeated with an ethoxylated alcohol surfactant solution which comprises 1.0% by volume ethoxylated alcohol in water. Once the injection sequence is completed, the temperature of the injection fluids is incrementally raised and the floods are repeated in the same manner as above. The results of the floods are shown in the table below.

|  | Temperature (°C.) | | | |
| --- | --- | --- | --- | --- |
|  | 29 | 49 | 66 | 82 |
| Slug: | % OIP | | | |
| Water | 21.6 | 27.3 | 38.5 | 55.7 |
| Surfactant | 18.0 | 30.3 | 63.5 | 70.8 |

It is apparent from the results that elevating the temperature of fluids used in the sequential injection process of the present invention produces beneficial oil recovery results.

While the foregoing embodiments of the invention have been described and shown, it is understood that alternatives and modifications, such as those suggested and others, may be made thereto and followed within the scope of the invention.

I claim:

1. A process for recovering oil from an oil-wet fractured subterranean oil-bearing formation having an ambient formation temperature and penetrated by at least two wells from the surface which are in fluid communication with said formation and with one another comprising:
    (a) injecting a first slug of a surfactant solution into said fractured formation via a first of said at least two wells, said surfactant solution capable of becoming the preferred wetting phase of an oil-wet matrix block in said fractured formation;
    (b) contacting a face of said oil-wet matrix block with said surfactant solution for a time sufficient for said surfactant solution to penetrate and become the preferred wetting phase of at least a portion of said matrix block thereby displacing oil from said portion of said matrix block toward said face of said matrix block;
    (c) injecting a second slug of a hot water having a temperature greater than said ambient formation temperature into said formation via a second of said at least two wells;
    (d) contacting said face of said matrix block with said hot water for a time sufficient for said hot water to penetrate and restore said portion of said matrix block to an oil-wet condition;
    (e) displacing said oil away from said face of said matrix block with said hot water toward said first well;
    (f) recovering said oil from said formation via said first well; and
    (g) repeating steps (a), (b), (c), (d), (e), and (f).

2. The process of claim 1 wherein said first well is shut in for a soak time during step (b).

3. The process of claim 1 further comprising heating said first slug of said surfactant solution to a temperature greater than said ambient formation temperature prior to step (a).

4. The process of claim 1 wherein the mobility of said first and second slugs are substantially about equal.

5. The process of claim 1 wherein said temperature of said hot water is greater than about 21° C.

6. The process of claim 1 wherein said hot water of said second slug is steam.

7. The process of claim 1 wherein the formation pressure at said first well does not substantially increase during steps (a) and (c).

8. A process for recovering oil from an oil-wet fractured subterranean oil-bearing formation having an ambient formation temperature and penetrated by at least two wells from the surface which are in fluid communication with said formation and with one another comprising:
    (a) injecting a first slug of a surfactant solution into said fractured formation via a first well of said at least two wells, said surfactant solution capable of becoming the preferred wetting phase of an oil-wet matrix block in said fractured formation;
    (b) contacting a face of said oil-wet matrix block with said surfactant solution for a time sufficient for said surfactant solution to penetrate and become the preferred wetting phase of at least a portion of said matrix block thereby displacing oil from said portion of said matrix block toward said face of said matrix block;
    (c) injecting a second slug of a hot water having a temperature greater than said ambient formation temperature into said formation via said first well;
    (d) contacting said face of said matrix block with said hot water for a time sufficient for said hot water to penetrate and restore said portion of said matrix block to an oil-wet condition; (e) displacing said oil away from said face of said matrix block with said hot water toward a second well of said at least two wells;
    (f) recovering said oil from said formation via said second well; and
    (g) repeating steps (a), (b), (c), (d), (e), and (f).

9. The process of claim 8 wherein said first well is shut in for a soak time during step (b).

10. The process of claim 8 further comprises heating said first slug of said surfactant solution to a temperature greater than said ambient formation temperature prior to step (a).

11. The process of claim 8 wherein the mobility of said first and second slugs are substantially about equal.

12. The process of claim 8 wherein the formation pressure at said second well does not substantially increase during steps (a) and (c).

13. The process of claim 8 wherein said temperature of said hot water is greater than about 21° C.

14. The process of claim 8 wherein said hot water of said second slug is steam.

15. A process for recovering oil from an oil-wet fractured subterranean oil-bearing formation having an ambient formation temperature and penetrated by at least three wells from the surface which are in fluid communication with said formation and with one another comprising:
   (a) injecting a first slug of a surfactant solution into said fractured formation via a first well of said at least three wells, said surfactant solution capable of becoming the preferred wetting phase of an oil-wet matrix block in said fractured formation;
   (b) contacting a face of said oil-wet matrix block with said surfactant solution for a time sufficient for said surfactant solution to penetrate and become the preferred wetting phase of at least a portion of said matrix block thereby displacing oil from said portion of said matrix block toward said face of said matrix block;
   (c) injecting a second slug of a hot water having a temperature greater than said ambient formation temperature into said formation via a second well of said at least three wells;
   (d) contacting said face of said matrix block with said hot water for a time sufficient for said hot water to penetrate and restore said portion of said matrix block to an oil-wet condition;
   (e) displacing said oil away from said face of said matrix block with said hot water toward a third well of said at least three wells;
   (f) recovering said oil from said formation via said third well; and
   (g) repeating steps (a), (b), (c), (d), (e), and (f).

16. The process of claim 15 wherein steps (c), (d), (e) and (f) are performed continuously.

17. The process of claim 15 wherein the mobility of said first and second slugs is substantially about equal.

18. The process of claim 15 further comprises heating said first slug of said surfactant solution to a temperature greater than said ambient formation temperature prior to step (a).

19. The process of claim 15 wherein the formation pressure at said third well does not substantially increase during steps (a) and (c).

20. The process of claim 15 wherein said hot water of said second slug is steam.

21. The process of claim 15 wherein said temperature of said hot water is greater than about 21° C.

* * * * *

UNITED STATES PATENT AND TRADEMARK OFFICE
CERTIFICATE OF CORRECTION

PATENT NO. : 5,014,783
DATED : May 14, 1991
INVENTOR(S) : D. Craig McClure

It is certified that error appears in the above-identified patent and that said Letters Patent is hereby corrected as shown below:

Title Page, left column: After "Findlay, Ohio" insert another section --[*] Notice: The portion of the term of this patent subsequent to June 27, 2006 has been disclaimed.--

Col. 1, lines 9-10: After "1989", delete --, now U.S. Pat. No. 4,842,065--.

Signed and Sealed this

Thirteenth Day of October, 1992

*Attest:*

DOUGLAS B. COMER

*Attesting Officer*     Acting Commissioner of Patents and Trademarks